United States Patent [19]
Schoonmaker et al.

[11] Patent Number: 5,841,269
[45] Date of Patent: Nov. 24, 1998

[54] POWER-DOWN CIRCUIT

[75] Inventors: Richard P. Schoonmaker, Wilton, Conn.; Wei C. Chen, Malden, Mass.; Johanna Degroot-Thomas, New York, N.Y.; Edward J. Naclerio, Madison, Conn.

[73] Assignee: Pitney Bowes Inc., Stamford, Conn.

[21] Appl. No.: 905,480

[22] Filed: Aug. 1, 1997

[51] Int. Cl.$^6$ .............................. G05F 1/569; H02H 3/18
[52] U.S. Cl. .............................................. 323/276; 361/86
[58] Field of Search ................................... 323/271, 276, 323/282; 365/226; 361/86, 115; 307/86

[56] References Cited

U.S. PATENT DOCUMENTS

| | | | |
|---|---|---|---|
| 4,611,282 | 9/1986 | McFiggans | 364/406 |
| 4,685,023 | 8/1987 | Heaston | 361/88 |
| 4,731,750 | 3/1988 | Hoflich et al. | 364/900 |
| 4,827,149 | 5/1989 | Yabe | 307/64 |
| 5,164,923 | 11/1992 | Avis | 368/4 |
| 5,182,810 | 1/1993 | Bartling et al. | 395/750 |
| 5,349,668 | 9/1994 | Gladstein et al. | 395/750 |
| 5,552,776 | 9/1996 | Wade et al. | 240/825.31 |
| 5,574,358 | 11/1996 | Garrett | 323/276 |
| 5,592,034 | 1/1997 | Felmus et al. | 307/130 |
| 5,655,070 | 8/1997 | Suwa et al. | 361/90 |
| 5,691,870 | 11/1997 | Gebara | 323/276 |

*Primary Examiner*—Stuart N. Hecker
*Attorney, Agent, or Firm*—Angelo N. Chaclas; Melvin J. Scolnick

[57] ABSTRACT

A power-down circuit includes a power-on reset circuit that determines whether the supplied power falls below a prescribed level and, in response, outputs a reset signal for at least a prescribed period of time. A power supply latching circuit is responsive to the power-on reset circuit for switching on a power supply switching circuit to supply power from a power supply when the reset signal is not output. A power-down shutdown circuit, preferably under software control, and a power cutoff circuit, may be coupled to the power supply latching circuit, or alternatively the power-on reset circuit, for shutting down the power supplied from the power supply.

16 Claims, 4 Drawing Sheets

POWER-DOWN CIRCUIT

TECHNICAL FIELD

The present invention relates to electronic devices and, more particularly, to an improved battery switch and controlled power-down circuit to shut off an electronic device.

BACKGROUND ART

Some electronic devices under microprocessor control receive power from a battery when not receiving power from an external power source, e.g. from an electrical outlet. These electronic devices typically include a battery power-down circuit for shutting down the battery power supply in response to a signal generated by the microprocessor. A general problem with conventional software controlled, battery power-down circuits is that they shut themselves off in addition to the main circuit, causing instability during the power-down process.

For example, many microprocessors are rated to operate at 5 V, but they may operate, though somewhat erratically, at lower supply potentials, even as low as 3 V. Accordingly, microprocessors typically receive a reset signal for halting operations from the battery power-down circuit during the power-down process. However, an inherent problem with conventional battery power-down circuits, which shut themselves off, is that they may cease to output the reset signal when the battery power reaches an intermediate voltage, e.g. 3–4 V, when a microprocessor may operate erratically. Since the power-down process may last for tens of milliseconds, the erratic behavior of a microprocessor operating at power below specifications may continue for a considerable number of microprocessor cycles. Erratic behavior may also occur outside of the power-down process during "brownout conditions," when the battery outputs power at less than the rated voltage.

In some electronic devices under microprocessor control, it is very important to reduce or eliminate erratic behavior of the microprocessor. For example, a postal meter is responsible for applying postage, purchased ultimately from the U.S. Postal Service. In this situation, there is a risk that the erratic behavior of the microprocessor performing postal meter functions may corrupt the memory holding the purchased postage, for example, causing a loss of postage.

DISCLOSURE OF THE INVENTION

There exists a need for a power-down circuit that is stable during the power-down process and which can detect and shutdown during brownout conditions. There is also a need for a power-down circuit that can output a microprocessor reset signal for a period of time sufficient to halt operations of the microprocessor during the power-down process.

These and other needs are met by the present invention in which a power-down circuit comprises a power supply switching circuit, which is responsive to a power-on signal for supplying power from a power supply, preferably a battery. A power-on reset circuit coupled to the power supply switching circuit determines whether the supplied power falls below a prescribed level and, in response, outputs a power suppression signal, e.g. a reset signal, for at least a prescribed period of time. A power supply latching circuit, coupled to the power supply switching circuit and the power-on reset circuit switches on the power-on when the power suppression signal is not output, thereby supplying power from the power supply.

Preferably, the power-down circuit also comprises a power shutdown circuit for suppressing the supplying of power from the power supply in response to a shutdown signal. The power-down circuit may include a power cutoff circuit for suppressing the supplying of power from the power supply when second power is supplied from a second power supply. An electronic device with a microprocessor system, such as a microprocessor or other central processing unit (CPU) preferably with memory such as RAM and ROM, comprises the power-down circuit, of which the reset signal resets the microprocessor for at least the prescribed period of time.

Additional objects, advantages, and novel features of the present invention will be set forth in part in the detailed description which follows, and in part will be come apparent upon examination or may be learned by practice of the invention. The objects and advantages of the invention may be realized and obtained by means of the instrumentalities and combinations particularly pointed out in the appended claims.

BRIEF DESCRIPTION OF DRAWINGS

The present invention is illustrated by way of example, and not by limitation, in the figures of the accompanying drawings, wherein elements having the same reference numeral designations represent like elements throughout and wherein:

FIG. 2(*b*) is a diagram of the battery power-down circuitry according to another embodiment.

BEST MODE FOR CARRYING OUT THE INVENTION

In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
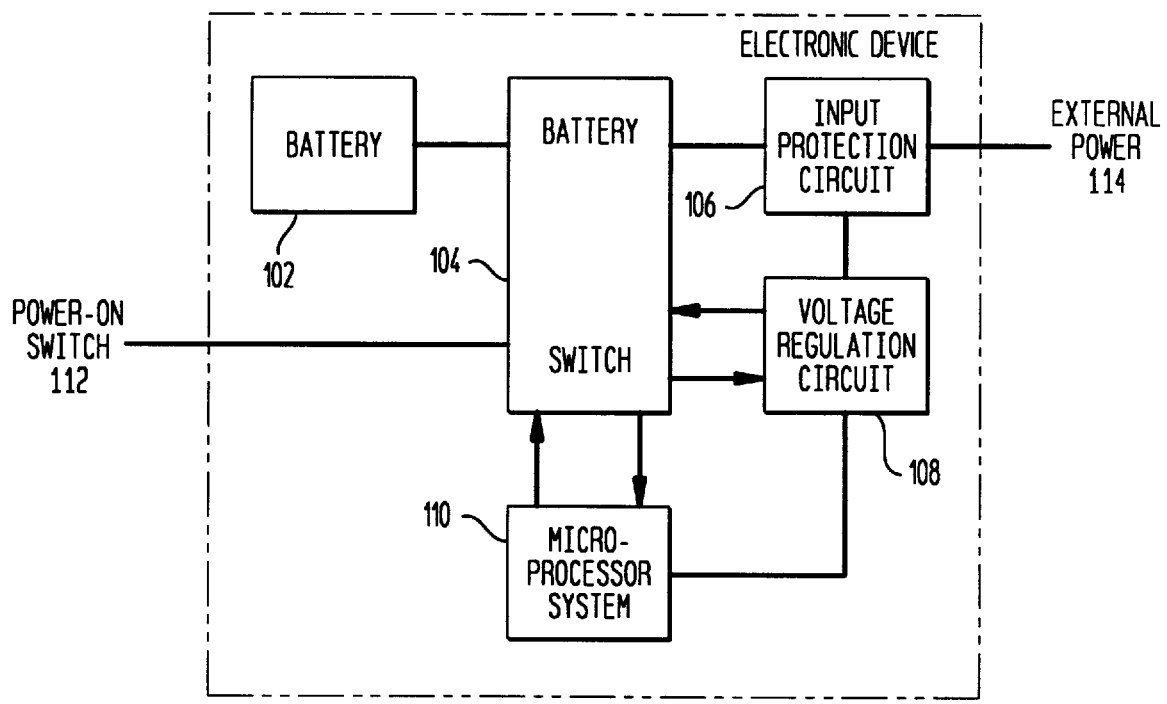
FIG. 1 is a high-level block diagram of an electronic device of an embodiment.

Referring to FIG. 1, an electronic device 100, such as a postal meter, receives power from one of two sources, a battery 102 power supply and an external power supply 114. Battery 102 supplies battery power to battery switch 104. Battery switch 104 is coupled to a power-on switch 112 for turning on battery power and coupled to input protection circuit 106, voltage regulator 108, and microprocessor system 110, for turning off battery power. When battery power is switched on, batter switch 104 supplies power to voltage regulator 108 for regulating the voltage of the battery power.

Input protection circuit 106 provides the electronic device 100 with over-voltage and over-current protection, as well as reducing noise and ripples. Power from input protection circuit 106 is applied to voltage regulation circuit 108 for regulating the voltage thereof and to battery switch 104 for switching off battery power when power from external power supply 114 is supplied.

Voltage regulation circuit 108 receives power from either battery 102, when battery switch 104 is switched on, from external power supply 114 via input protection circuit 106, when external power is supplied. Moreover, voltage regulation circuit 108 supplies battery switch 104 with regulated power so that battery switch 104 can shutdown the power supply from the battery 102 in brownout conditions or during a power down process.

Microprocessor system 110 includes the main components such as a microprocessor and memory (not shown) for performing the functions of the electronic device 100. For example, in a postal meter, microprocessor system 110 is responsible for managing the amount of postage a user of the postal meter has purchased and wishes to apply to a piece of mail.

Microprocessor system 110 is configured to receive a reset signal from battery switch 104 if power from voltage regulator 108 falls below a prescribed level, e.g., in the range 4.4 V to 4.65 V. In response to the reset signal, the microprocessor system 110 halts operation. Microprocessor system 110 is also configured to assert a shutdown signal. In response to the shutdown signal, battery switch 104 suppresses the supplying of power from battery 102 to voltage regulator 108 and outputs the reset signal to the microprocessor system 110 for halting operation thereof.

Figure 2A:
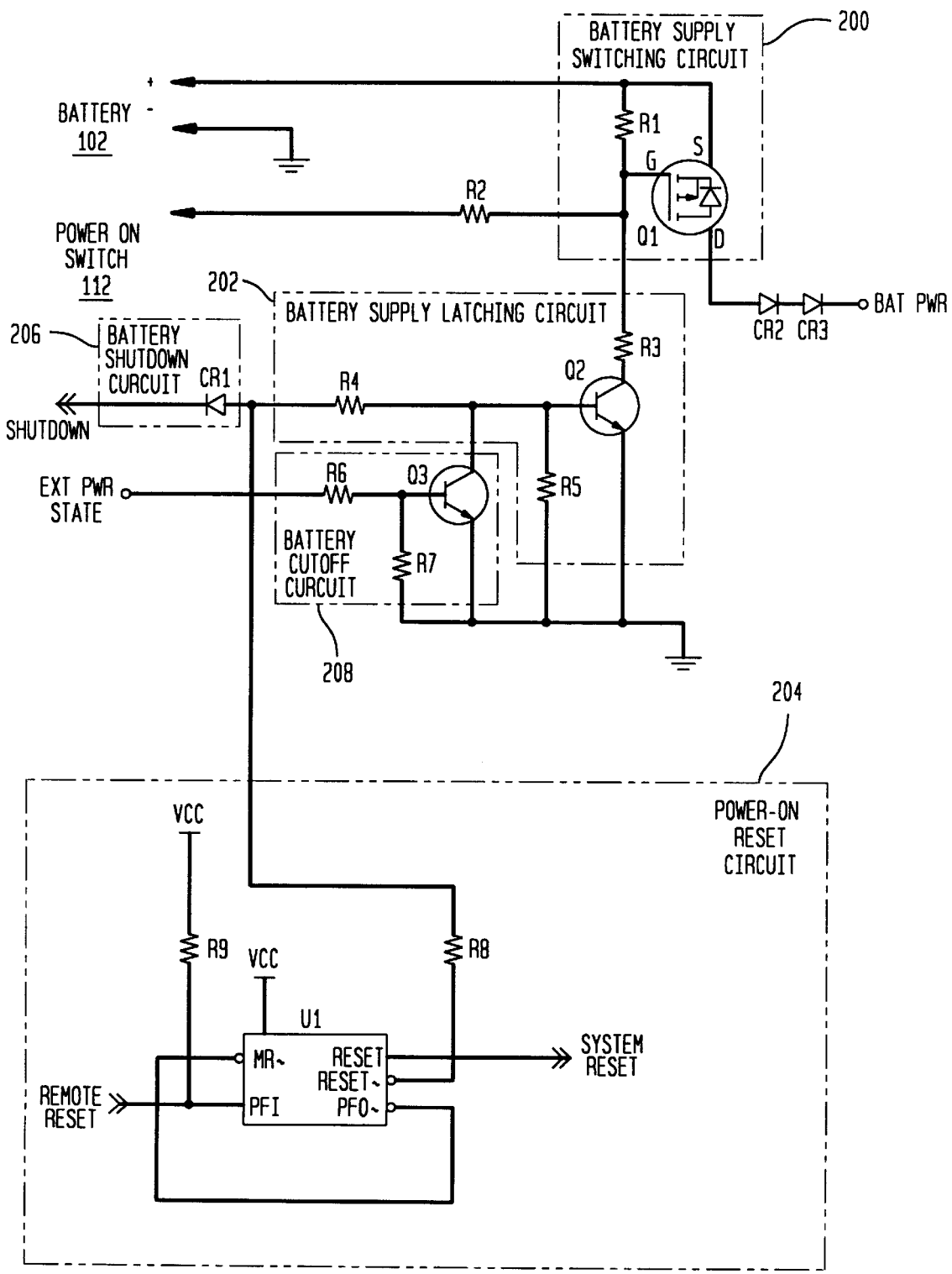
FIG. 2(*a*) is a diagram of the battery power-down circuitry according to one embodiment.

A preferred embodiment of battery switch 104 is shown in FIG. 2(a). When all power is off, power FET Q1 of battery supply switching circuit 200 is not turned on, because resistor R1 ensures that the gate of FET Q1 is charged to keep FET Q1 from conducting. The gate leakage current of FET Q1 is very low (fractions of nanoamperes), resulting in a very small parasitic current loss from battery 102.

The battery supply from battery 102 is initially turned on by grounding the power-on switch 112, e.g. by closing a momentary type switch, causing battery current to flow through resistors R1 and R2 and hence turning on FET Q1. The output of FET Q1 flows through blocking diodes CR2 and CR3 to an input of voltage regulation circuit 108. The battery voltage is regulated to the system logic voltage VCC by voltage regulator 108, as described in more detail hereinafter.

Power-on reset circuit 204 monitors system logic voltage VCC directly. If system logic voltage VCC drops below a prescribed level, e.g. 4.4 V, power-on reset device U1 outputs a reset signal. The reset signal is asserted as long as the system logic voltage VCC is within a range of prescribed levels, e.g. from 1 V to 4.4 V, and thence for a prescribed period of time, e.g. 200 ms, sufficient to cause microprocessor system 100 to completely halt operations. Moreover, a system level remote reset signal can be applied, bringing down the voltage at resistor R9 and at the input power fail PFI input of the power-on reset device U1.

In one implementation of the power-on reset device U1, for example, a MAX708 available from Maxim Corp., a fall in the level of the PFI input below a prespecified level, e.g. 1.25 V, causes the negative logic PFO~ (power fail output) signal to be asserted. The PFO~ signal is applied to the master reset MR~ input, which asserts the reset signal for at least a prescribe period of time, e.g. 200 ms, notwithstanding the voltage level of the system logic power VCC.

The complement of the reset signal output from power-on reset circuit 204 is applied to a battery supply latching circuit 202. Specifically, the complemented reset signal passes through resistor R4 and drives the base of transistor Q2, causing the collector of transistor Q2 to switch to logic common (low voltage) and current to flow through resistor R3, which turns on FET Q1 in the same manner as pressing the battery power-on switch 112. In effect, battery supply latching circuit 202, by causing current to flow through resistor R3 when there is not a reset signal from power-on reset circuit 204, simulates a continuous closure of the battery power-on switch 112. Thus, battery power is supplied through battery supply switching circuit when the reset signal is not being asserted.

Microprocessor system 110 may be configured to output a shutdown signal when, for example, it has received no input from a user in two minutes. In this case, microprocessor system 110 would drive the cathode of diode CR1 of battery shutdown circuit 206 low through, e.g., an output port (not shown) to remove the drive current from power-on reset circuit 204. Accordingly, transistor Q2 of the battery supply latching circuit 202 is no longer turned on, causing FET Q1 of the battery supply switching circuit 200 to turn off as well. When FET Q1 is turned off, the battery power is prevented from being supplied to voltage regulator 108, causing a fall in the system logic voltage VCC. When the system logic voltage VCC falls below the prescribed level, the power-on reset device 204 asserts the reset signal and removes the drive power to transistor Q2 for at least the prescribed period of time after the system logic voltage VCC reaches the prescribed low voltage. Since the reset signal is asserted throughout the power-down process, the microprocessing system 110 is prevented from any operation, including erratic operations.

Figure 3:
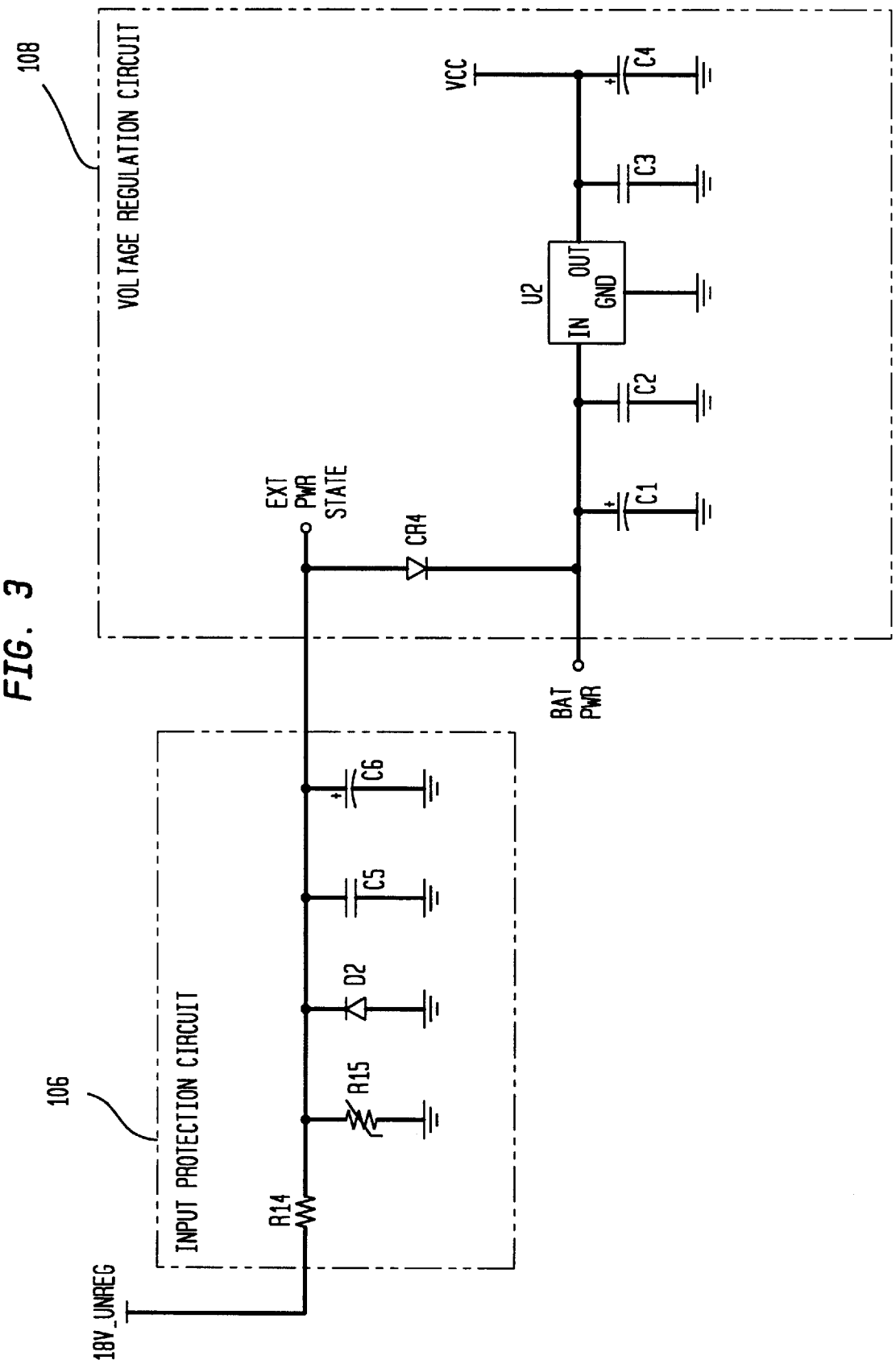
FIG. 3 is a diagram of the input protection and voltage regulation circuitry of an embodiment.

Referring to FIG. 3, voltage regulation circuit 108 receives battery power from battery power switching circuit 200 within battery switch 104 for regulating the battery power. Specifically, voltage regulation circuit 108 employs input filter capacitors C1 and C2, voltage regulator U2, and output filter capacitors C3 and C4 for providing system logic power VCC. System logic power VCC is applied directly to power-on reset circuit 102 for determining whether the system logic power VCC is above a prescribed threshold level.

As depicted in FIG. 3, voltage regulation circuit 108 may also receive power input V_UNREG from an external power supply 114. The external power V_UNREG passes through an input protection circuit 106 comprising resistors R14 and R15 and diode D2 for providing over-current and over-voltage protection to the rest of the circuit. Capacitors C5 and C6 provide input power filtering to reduce ripples in the external power V_UNREG. Blocking diodes CR2, CR3, CR4 prevent current from flowing back to the other power supply when one of the two supplies is operating.

A signal, EXT PWR STATE, indicating that external power is being supplied to the voltage regulation circuit, is applied to battery cutoff circuit 208 depicted in FIG. 2(a) in order to prevent battery discharge during the normal operation of the electronic device 100 when powered by the external power supply 114. When external power is powering the electronic device 100, current flows from input protection circuit 106 through resistor R6 to the base of transistor Q3, turning transistor Q3 on. When transistor Q3 is turned on, transistor Q2 of the battery latching circuit 202 is effectively held in the off state, preventing FET Q1 of the batter switching circuit 200 from supplying battery power to voltage regulation circuit 108.

In sum, battery power may be terminated from any one of three different sources. First, if the battery power drops below a prescribed threshold, e.g. 4.4 V, the power-on reset circuit 204 outputs a reset signal and causes battery supply latching circuit 202 to switch off battery supply switching circuit 200, resulting in a drop of the system logic voltage VCC. The power-on reset circuit 204 holds the battery supply switching circuit 200 in the off state until the system logic voltage VCC has dropped to a safe and near zero potential, e.g. 1 V.

Second, the shutdown signal under software control causes the battery supply latching circuit 202 to switch off battery supply switching circuit 200, resulting in a drop of the system logic voltage VCC. The power-on reset circuit 204 holds the battery supply switching circuit 200 in the off state until the system logic voltage VCC has dropped to a safe and near zero potential.

Third, coupling an external power supply 114 to the electronic device 100 asserts the EXT PWR STATE signal, which turns off the battery supply latching circuit 202, via battery cutoff circuit 208. Thus, battery power from battery 102 is prevented from being supplied when the external power supply 114 is supplying power.

Figure 2B:
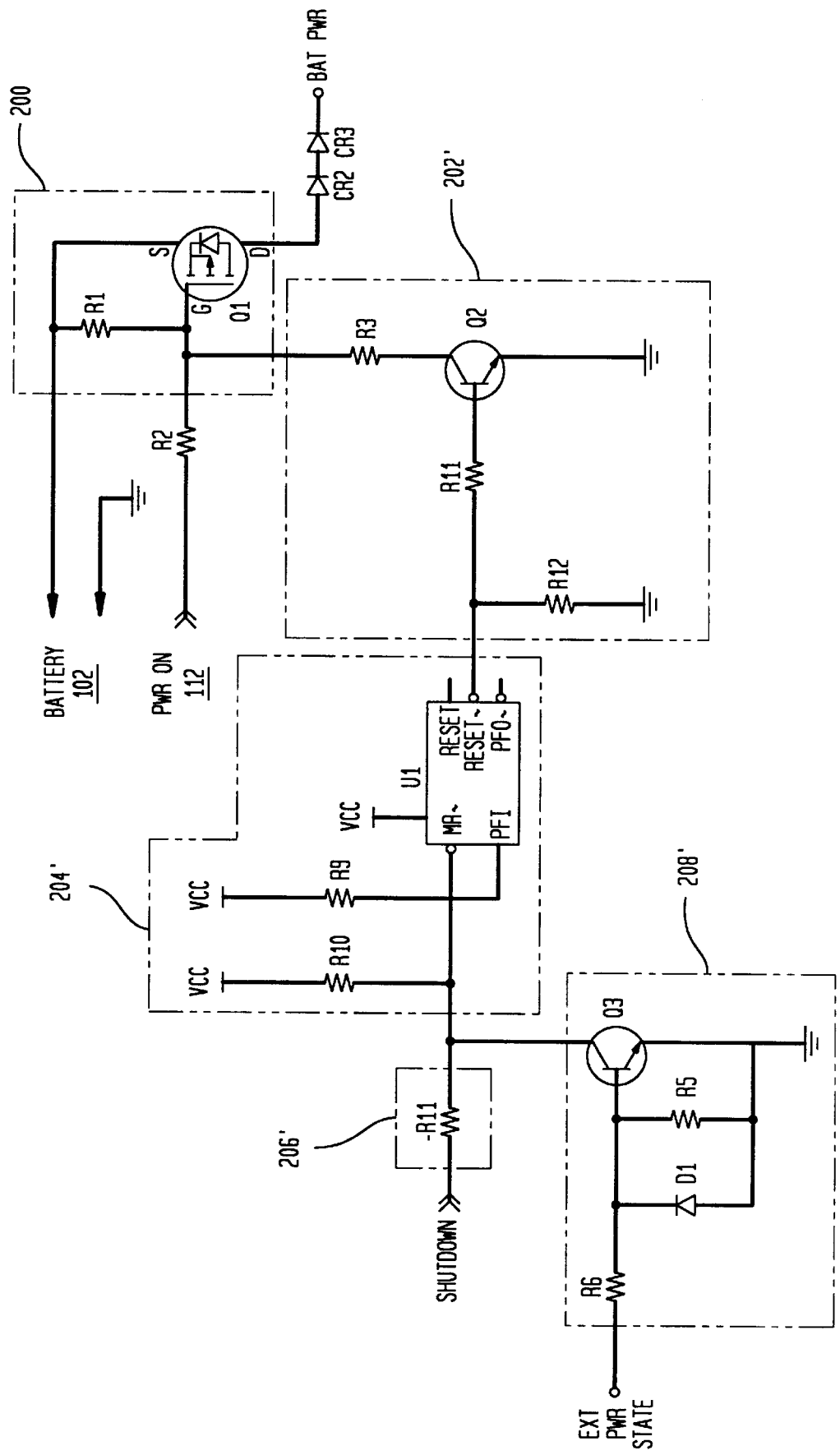

The present invention is capable of various modifications without departing from the spirit of the invention. For example, the battery shutdown circuit 206' and the battery cutoff circuit 208' may be coupled to an input of the power-on reset circuit 204' instead of the battery supply latching circuit 202', as depicted in FIG. 2(b). This configuration, however, the power-on reset circuit 202' is only used to shut-down down the battery supply and another reset circuit coupled to the system logic power VCC is used for producing the system reset signal. Thus, the output of the power-on reset circuit 202' may be characterized as a power suppression signal.

FIG. 2(b) also depicts some of the various modifications which may be made to the individual component circuits, some of which are implemented differently due to the different placement thereof in the power-down circuit. For instance, since battery shutdown circuit 206' is coupled to a pull-up resistor R10, battery shutdown circuit 206' may be implemented with resistor R11 rather than diode CR1. The battery power supply is shut off when the power-on reset device is controlled by the battery shutdown circuit 206' or the battery cutoff circuit 208' into outputting the power suppression signal.

As other examples of various modifications, battery cutoff circuit 208' may include an additional breakdown diode D1 to protect transistor Q3. Battery supply latching circuit 202' may position differently the pull-down resistor R12, employed because the RESET~ output floats if the system logic power VCC drops close to zero, e.g. 1 V.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A power-down circuit comprising:
   a power supply switching circuit coupled to a power supply and responsive to a power-on signal, for supplying power from the power supply;
   a power-on reset circuit, coupled to the power supply switching circuit, for determining whether the supplied power falls below a prescribed level and, in response, outputting a power suppression signal for at least a prescribed period of time; and
   a power supply latching circuit, coupled to the power supply switching circuit and the power-on reset circuit, for switching on the power-on signal when the power suppression signal is not output, thereby supplying the power from the power supply.

2. The power-down circuit of claim 1, wherein the power supply is a battery.

3. The power-down circuit of claim 1, further comprising a power shutdown circuit coupled to the power-on reset circuit, for causing the power-on reset circuit to output the power suppression signal, thereby suppressing the supplying of power from the power supply.

4. The power-down circuit of claim 1, further comprising a power cutoff circuit, coupled to a second power supply and the power-on reset circuit, for causing the power-on reset circuit to output the power suppression signal when second power is supplied by the second power supply.

5. The power-down circuit of claim 1, further comprising a power cutoff circuit, coupled to a second power supply and the power-on reset circuit, for causing the power-on reset circuit to output the power suppression signal when second power is supplied by the second power supply.

6. The power-down circuit of claim 1, further comprising a power cutoff circuit, coupled to a second power supply circuit and the power supply latching circuit, for causing the power supply latching circuit to switch off the power-on signal when second power is supplied by the second power supply.

7. A power-down circuit comprising:
   a power supply switching circuit coupled to a power supply and responsive to a power-on signal, for supplying power from the power supply;
   a power-on reset circuit, coupled to the power supply switching circuit, for determining whether the supplied power falls below a prescribed level and, in response, outputting a reset signal for at least a prescribed period of time; and
   a power supply latching circuit, coupled to the power supply switching circuit and the power-on reset circuit, for switching on the power-on signal when the reset signal is not output, thereby supplying the power from the power supply; and
   a power shutdown circuit coupled to the power supply latching circuit, for causing the power supply latching circuit to switch off the power-on signal in response to receiving a shutdown signal, thereby suppressing the supplying of the power from the power supply.

8. The power-down circuit of claim 7, further comprising a power cutoff circuit, coupled to a second power supply circuit and the power supply latching circuit, for causing the power supply latching circuit to switch off the power-on signal when second power is supplied by the second power supply.

9. The power-down circuit of claim 7, wherein the power-on reset circuit is configured to receive a remote reset signal and, in response, cause the power-on reset circuit to output the reset signal, thereby suppressing the supplying of power from the power supply.

10. The power-down circuit of claim 7, wherein the power supply is a battery.

11. An electronic device, comprising:
   a microprocessor system;
   a battery;
   a power-on switch;
   a battery supply switching circuit coupled to the battery and responsive to a power-on signal from the power-on switch, for supplying battery power from the battery;
   an external power input protection circuit for supplying external power received from an external power source;
   a voltage regulation circuit receiving power supplied from the battery supply switching circuit and the external power input protection circuit and coupled to the microprocessor system for regulating the battery power and the external power for supplying regulated power to the microprocessor system;

a power-on reset circuit, coupled to the voltage regulation circuit and the microprocessor system, for determining whether the regulated power falls below a prescribed level and, in response, outputting a reset signal to the microprocessor system for at least a prescribed period of time sufficient to halt operations of the microprocessor system; and a battery supply latching circuit, coupled to the battery supply switching circuit and the power-on reset circuit, for switching off the power-on signal when the reset signal is output, thereby suppressing the supplying of the battery power from the battery for the prescribed period of time.

12. The electronic device of claim 11, wherein the microprocessor is configured to perform postal meter functions.

13. The electronic device of claim 11, further comprising a battery shutdown circuit coupled to the battery supply latching circuit, for causing the battery supply latching circuit to switch off the power-on signal in response to receiving a shutdown signal from the microprocessor, thereby suppressing the supplying of the battery power from the battery power.

14. The electronic device of claim 13, further comprising a battery power cutoff circuit, coupled to the external power input protection circuit and the battery supply latching circuit, for causing the power supply latching circuit to switch off the power-on signal when external power is supplied by the external power input protection circuit.

15. The electronic device of claim 11, wherein the power-on reset circuit is configured to receive a remote reset signal and, in response, cause the power-on reset circuit to output the reset signal, thereby suppressing the supplying of battery power from the battery.

16. The electronic device of claim 11, further comprising a battery power cutoff circuit, coupled to the external power input protection circuit and the battery supply latching circuit, for causing the power supply latching circuit to switch off the power-on signal when external power is supplied by the external power input protection circuit.

* * * * *